Feb. 8, 1938.   C. B. PAPE ET AL   2,107,798
METHOD AND APPARATUS FOR TREATING DRIED FRUITS
Filed Jan. 2, 1937
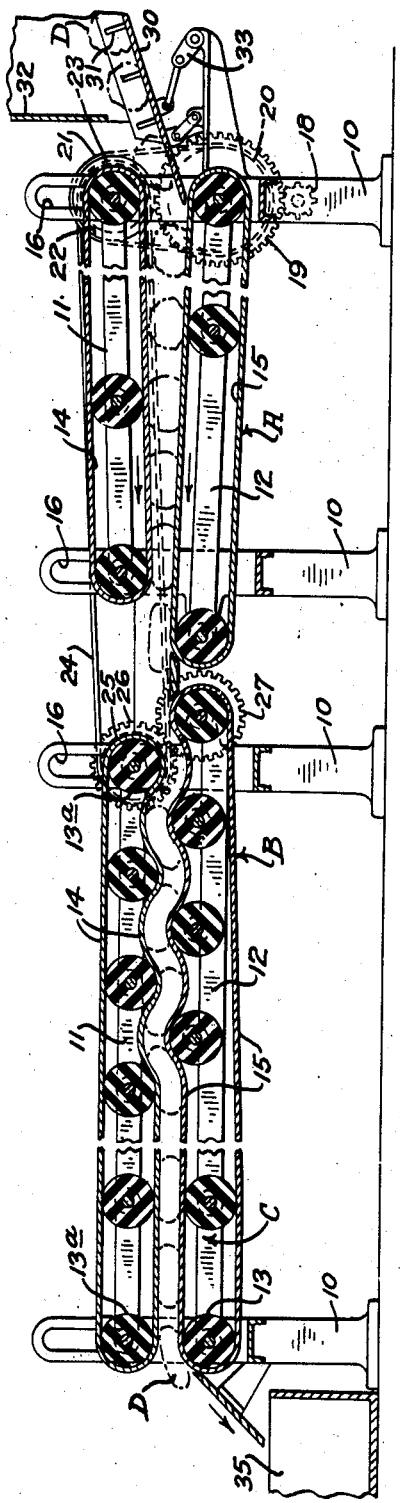
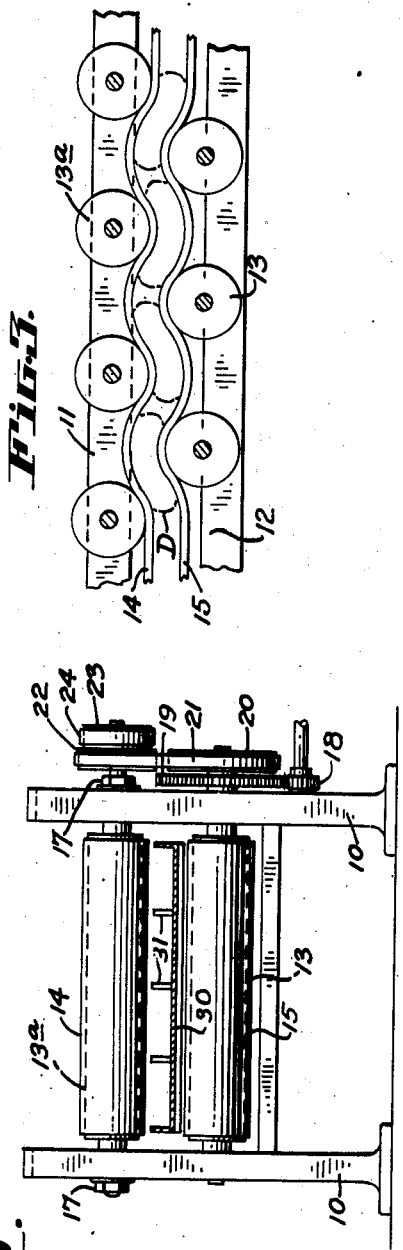
INVENTORS
CLIFFORD B. PAPE
ELISHA N. THAYER
THEODOR A. SCHWARZ
BY
ATTORNEY.

Patented Feb. 8, 1938

2,107,798

UNITED STATES PATENT OFFICE 2,107,798

METHOD AND APPARATUS FOR TREATING DRIED FRUITS

Clifford B. Pape and Elisha N. Thayer, San Jose, and Theodor A. Schwarz, Menlo Park, Calif.

Application January 2, 1937, Serial No. 118,744

13 Claims. (Cl. 99—104)

This invention relates to a method and apparatus for treating dried fruits, and more particularly to means and method for preparing dried fruits in a relatively flat and relatively thin form. It is well-known that heat penetrates more slowly through a thick product than a thin product, and any treatment which would make a thick dried fruit product relatively thinner would be to assist penetration thereof by heat. It is also well-known that the manipulation of any dried fruit, particularly if such manipulation takes place shortly after heating same, tends to break down and distort the fibrous materials and soften or decrease the viscosity of the jelly-like substances contained in the fruit, such as pectins which cement the cell walls of the product together. If the dried fruit is of a type containing a pit, the manipulation of the pulp of the dried fruit, particularly after heating thereof, tends to loosen the flesh from the pit so that the pit is readily removed.

It is also a customary practice in the art of packing dried fruit to place a layer of facing fruit on the top of a package for improvement of the appearance of the package. This facing layer is usually composed of the pieces of fruit which are of selected grade flattened from a more or less spherical or ovate form. Flattening of the separate pieces in this facing layer of fruit has heretofore been done by manual finger manipulation of the separate pieces. The operation has therefore been expensive, and it has prevented the customer from knowing the type of the fruit underlying the facing layer.

The method of this invention has in contemplation that a great many, and, in fact, most varieties of dried fruits, receive a commercial processing treatment of some kind before they are placed on the commercial market. Some fruits are sulphured, others receive a treatment with a caustic alkali, while still others are heated for various periods and various purposes. For instance, with prunes, it is customary to give them a moist heat treatment for a short period, one to three minutes, before they are packed, since such heat treatment softens the pulp so that the fruit may be more readily packed into a tightly packed mass under pressure; also the heat and moisture absorbed by the pulp caramelizes the sugar and helps to maintain the fruit in a soft, attractive condition until it reaches the customer. The method and apparatus of this invention may be employed in treating the fruit either before or after the aforesaid commercial processing. If the method and apparatus of this invention be employed prior to such commercial processing, it is desirable that the fruit be subjected to a moist heat for a very short period before the method of this invention is employed. If this invention is employed subsequent to a commercial processing which employs moist heat to soften the pieces of fruit, then additional preheating is not required, but the treatment of the fruit in a flattened form diffuses the heat more quickly and more evenly through the product.

Further, in cooking the fruit by the ultimate consumer, the pieces of fruit which have been flattened, being relatively thinner than the remainder of the pieces of fruit, becomes thoroughly cooked by the time the pieces of fruit from the underlying layers have become only partially cooked, or the individual pieces which have not been flattened will become thoroughly cooked adjacent their exterior surfaces, while the central portion of the piece of fruit remains hard and substantially uncooked. Flattening the pieces of fruit and making them relatively thin and of even thickness not only facilitates commercial processing by heat and the cooking by the consumer, but also produces a distinctive, attractive, and individual product in its appearance.

The method and apparatus of this invention is not to be confused with the well-known practice of packing fruit "helter-skelter" in a box to an overrun capacity and then flattening the top layer by pressure on the box lid in the sealing thereof. Nor is it to be compared with the well-known practice of forming a block or brick of dried fruit by compressing same into a form which gives a flat appearance to the outside of the compressing fruit. Both of these well-known methods of packaging give a flat appearance to one side of a piece of fruit and also a flat appearance to the complete outside of a compressed bulk of fruit, but in either event the individual pieces composing the center of the bulk as well, as the inner surface of the individual pieces forming the outside layer, are irregular.

Among the objects of this invention are to provide an apparatus and method for treating dried fruits by which an entire pack may be made uniformly relatively thin and relatively flat whether in the block or in package form, and whereby the dried fruit may be manipulated in large quantities by individual pieces, so that the fibers thereof and the pectins and the sugars may be kneaded and manipulated so that the individual pieces of fruit remain relatively soft and pliable and whereby the flesh of the fruit is worked loose from the pit in those cases where the fruit has a pit. Since the method steps of the process may be performed by many mechanical means. One form of apparatus for carrying out the method of the invention is illustrated in the appended drawing and described herein, and the method of the invention is described in connection with said apparatus.

In the drawing which by reference thereto is made a part of this application, Fig. 1 is a longitudinal vertical section on line II of Fig. 2.

Fig. 2 is an end view of Fig. 1, from the right hand end of the drawing.

Fig. 3 is a fragmentary enlarged view showing detail of structure.

Referring to the drawing in which like characters of reference indicate corresponding parts in the several views, 10 indicates standards providing a frame for supporting a plurality of movable belt sections indicated A, B, and C. The belts are in overlying relation in the several sections and may be of any suitable length and of sufficient width to accommodate the capacity of a dried fruit packing plant of any size, the greater the width of the belts the greater the capacity of the apparatus. Upon the standards 10 are mounted a pair of bars for each belt section, 11 indicating the upper bars and 12 the lower bars. Journaled rotatably in the bars 11 and 12 are shafts of rollers 13, one of which 13a, is a drive roller. The rollers may be of any suitable material, but preferably are of a resilient material such as sponge rubber. Mounted upon both the upper and lower rollers, for flight movement thereby are carrier or conveyer belts, 14 indicating the upper belts and 15 the lower belts. The adjacently opposed faces of the respective overlying belts are relatively spaced, such spacing being predetermined at suitable distances by relative adjustability of the upper and lower rollers, suitable means for such adjustability being provided for at least one set of the bars supporting the rollers, such as slots 16 and clamp nuts 17 by which the upper bars 11 are supported on the standards. The belts are sufficiently flexible so that they exert yielding pressure on the pieces of fruit; that is, they have sufficient resilience so as not to crush the pieces therebetween, especially if sponge rubber rollers are employed.

The rollers may be driven in any suitable well-known manner. As herein exemplified, a spur gear 18 driven from any suitable power source, meshes with drive gear 19 in belt section A, rotating pulley wheel 20 co-axially mounted thereto, the latter driving belt 21 which passes around pulley wheel 22, which latter may carry an additional pulley 23 for driving a belt 24, the latter rotating pulley wheel 25 of belt section B which, through a co-axial connected gear 26 drives the upper belt of section B and meshes with a gear 27 which drives the lower belt of section B. The pulleys 20, 22, and gears 26, 27 rotate the several respective belt-driving rollers 13a and thereby drive the respective belts.

In one of the belt sections exemplified herein in section A, the flight movement of the overlying belts may be at different relative speeds, here accomplished by having pulley 20 of larger diameter than the pulley 22, thus imparting a twisting or rolling effect to a piece of fruit between the belts and thereby exerting different degrees of frictional pull on the opposite faces of the piece of fruit. The action mechanically manipulates the pulp portion of the fruit and tends to disconnect the pulp from the pit, if the fruit being treated has a pit.

In belt section A it will be noted that the opposed faces of the respective belts 14 and 15 converge from a feed end to the opposite end, providing a greater space between the opposing belt faces at the feed end so as to receive the pieces of fruit indicated D in a generally spherical or ovate form and reduce them to a relatively flat and thinner form at the opposite end of belt section A, kneading it in transit both by compressing it to the flat form and also by the twisting or rolling stress due to one belt moving at greater speed than the other.

A piece of fruit having traversed the belt flight of section A, is received between the opposed belt faces of section B. In section B the axes of rotation of the rollers of the upper belt 14 are offset or staggered in a vertical plane relative to the axes of rotation of the rollers of the lower belt 15, so that in transit by the belt and in passing between the rollers of section B, the fruit is manipulated successively, first in the arc of the circumference of an upper roller and then in an arc of the circumference of a lower roller, thus by bending the piece of fruit back and forth, the texture of the grain of the pulp and the cell structure is thoroughly disrupted so that when the piece of fruit has been passed through this extended path of travel during its mechanical manipulation and is released from pressure at the end of said path, it has been kneaded beyond its capacity to return to its spherical or ovate form and thereafter maintains its flat thin form, regardless of whether it is thereafter packed in layers or stored helter skelter in bulk.

If desired a dressing or finishing belt section C may be employed at the discharge end of the extended path of kneading treatment, for the purpose of pressing the fruit to a uniform thickness and flatness, since the treatment through section B may leave some pieces of fruit slightly curved or not exactly uniform in flatness or thickness. The belts 14, 15 of section C may be a continuation of the belts 14, 15 of section B or they may be independent of the similarly numbered belts of section B, and driven in any suitable manner. In the present exemplification, the belts of section C are a continuation of the belts of section B. In section C the axes of rotation of the rollers 13 in the respective upper and lower belt sections 14, 15 are aligned vertically and their circumferences in contact with their respective belts are horizontally aligned so that the upper and lower belts of section C present flat horizontally parallel opposed surfaces.

At the feed end of the apparatus, there is provided a feed for the pieces of fruit, comprising a chute 30 which may be provided with spaced pins 31 for separating and evenly spreading the pieces of fruit and delivering same to the initial receiving belts. A gate 32 may transversely overhang the chute 30 for leveling the fruit on the feed chute. The feed chute may also be provided with a vibrator 33 of any suitable type to assist in spreading the fruit evenly in the feed chute.

While in section A one of the belts is moved at greater speed than the other belt, the upper and lower belts in sections B and C preferably move at the same rate of speed.

With the foregoing description, it is believed that the method and apparatus of this invention will require only brief description of operation. Broadly, the method contemplates the mechanical, gentle manipulation of the pulp of dried fruit through an extended path of travel preferably under a resilient pressure, and more specifically, breaking down the fiber and cellular structure which contains the sugar and pectin, and gradually reduces the fruit body to a flattened thin form. In so doing, the pieces of fruit D are fed to the chute 30, spread by the gate 32, and the vibration of the chute, and deposited between the belts 14, 15 of section A which have opposed faces moving in the same direction, but at relatively varying speeds, so that the fruit is subjected to a slightly rolling action in transit and simultaneously reduced to a predetermined thickness by the time of reaching the end of the belts of section A; the pieces are then received between the belts of section B which likewise have their opposed faces moving in the same direction, and preferably at the same speed, but with rollers having their respective axes of rotation relatively offset vertically providing a tortuous or sinuous path between the opposing belt faces; then the manipulated and kneaded pieces of fruit are delivered to the belts of the rollers in section C where they are ironed out uniformly into flat thin pieces, after which the pieces are discharged to a receiving bin 35 for such disposition as may be thereafter desired. Thus, large quantities of individual pieces of dried fruit may be treated to manipulation and kneading in transit through an extended path of travel so that they are flattened, made relatively thin, and whereby the fibers and cell structure receive a set so that it will not return normally to its original shape, and the pulp is loosened from the pit in those types of dried fruits which have a pit therein.

Having thus described the invention, we claim:—

1. A method of treating dried fruits comprising the steps of separating a bulk of pieces of fruit into independent individual pieces, simultaneously subjecting a plurality of said individual pieces to transit through an extended path of travel, and subjecting said individual pieces to mechanical manipulative progressively increasing pressure independently of each other during the transit thereof through said extended path of travel for reducing the thickness of said individual pieces.

2. A method of treating dried fruits comprising the steps of separating a bulk of pieces of fruit into independent individual pieces, simultaneously subjecting a plurality of said individual pieces to transit through an extended path of travel, and subjecting said individual pieces to progressively increasing yielding and kneading pressure independently of each other during the transit thereof through said extended path of travel for reducing the thickness of said individual pieces.

3. A method of treating dried fruits comprising the steps of separating a bulk of pieces of fruit into independent individual pieces, simultaneously subjecting a plurality of said individual pieces to transit through an extended path of travel, and subjecting said individual pieces to yielding pressure during the transit thereof through said extended path of travel until said pieces are reduced in thickness.

4. A method of treating dried fruits comprising the steps of separating a bulk of pieces of fruit into independent individual pieces, simultaneously subjecting a plurality of said individual pieces to transit through an extended path of travel, subjecting said individual pieces to pressure independently of each other during the transit thereof through said extended path of travel, and kneadingly manipulating said pieces in transit beyond the capacity of the cell structure to automatically return the said pieces of fruit to their original form.

5. A method of treating dried fruits comprising the steps of separating a bulk of pieces of fruit into independent individual pieces, simultaneously subjecting a plurality of said individual pieces to transit through an extended path of travel, subjecting said individual pieces to yielding pressure during the transit thereof through said extended path of travel until said pieces are reduced in thickness, and manipulating said pieces in transit beyond the capacity of the cell structure to automatically return the said pieces of fruit to their original form.

6. A method of treating dried fruits comprising the steps of separating a bulk of pieces of fruit into independent individual pieces, simultaneously subjecting a plurality of said individual pieces to transit through an extended path of travel, subjecting said individual pieces to pressure during the transit thereof through said extended path of travel, and manipulating said pieces in transit by kneading the pulp thereof beyond the capacity of the cell structure to automatically return the said pieces of fruit to their original form.

7. A method of treating dried fruits comprising the steps of separating a bulk of pieces of fruit into independent individual pieces, simultaneously subjecting a plurality of said individual pieces to transit through an extended path of travel, subjecting said individual pieces to yielding pressure during the transit thereof through said extended path of travel, and manipulating said pieces in transit by kneading the pulp thereof beyond the capacity of the cell structure to automatically return the said pieces of fruit to their original form.

8. A method of treating dried fruits comprising the steps of separating a bulk of pieces of fruit into independent individual pieces, simultaneously subjecting a plurality of said individual pieces to transmit through an extended path of travel, subjecting said individual pieces to yielding pressure during the transit thereof through said extended path of travel until said pieces are reduced in thickness, and manipulating said pieces in transit by kneading the pulp thereof beyond the capacity of the cell structure to automatically return the said pieces of fruit to their original form.

9. An apparatus for treating dried fruit including a feed separator adapted for separating the bulk of dried fruit into independent pieces, a carrier for simultaneously receiving from the feed separator a plurality of individual pieces of dried fruit and transporting them through an extended path of travel and including means for kneadingly manipulating the said individual pieces during the transit thereof through said extended path of travel, said carrier having converging relatively spaced opposing faces for reducing the thickness of said individual pieces and forming them relatively thin and flat, and means for driving said carrier means.

10. An apparatus for treating dried fruit including a feed separator adapted for separating the bulk of dried fruit into independent pieces, a carrier for simultaneously receiving from the feed separator a plurality of individual pieces of dried fruit and transporting them through an extended path of travel and including progressively converging yieldable pressure members for kneadingly manipulating the said individual pieces during the transit thereof through said extended path of travel, and for reducing the thickness of said individual pieces and forming them relatively thin and flat, and means for driving said carrier.

11. An apparatus for treating dried fruit including means to separate and spread a bulk of dried fruit into individual pieces, a carrier for simultaneously receiving a plurality of said individual pieces and transporting them through an extended path of travel, said carrier including movable relatively spaced converging belts adapted for movement at different relative speeds and including means for kneadingly manipulating the said individual pieces during the transit thereof through said extended path of travel, and means for driving said carrier means.

12. An apparatus for treating dried fruit including means to separate and spread a bulk of dried fruit into individual pieces, a carrier for simultaneously receiving a plurality of said individual pieces and transporting them through an extended path of travel, said carrier including movable, relatively spaced converging belts adapted for kneadingly manipulating the said individual pieces during the transit thereof through said extended path of travel, and means for driving said carrier means.

13. An apparatus for treating dried fruit including means to separate and spread a bulk of dried fruit into individual pieces, a carrier for simultaneously receiving a plurality of said individual pieces and transporting them through an extended path of travel, said carrier including movable relatively spaced belts, converging at one portion and being mounted at another portion upon rollers which have their axes of rotation relatively staggered in a vertical plane, and driving means for said carrier.

CLIFFORD B. PAPE.
ELISHA N. THAYER.
THEODOR A. SCHWARZ.